– Patented Nov. 18, 1947

2,431,185

UNITED STATES PATENT OFFICE 2,431,185

ELECTRIC INCANDESCENT LAMP GETTER

Sidney Launcelot Martin and Christopher Frederic Peter Bevington, London, England, assignors, by mesne assignments, to General Electric Company, Schenectady, N. Y., a corporation of New York No Drawing. Application October 19, 1945, Serial No. 623,440. In Great Britain June 14, 1944

Section 1, Public Law 690, August 8, 1946
Patent expires June 14, 1964

10 Claims. (Cl. 176—16)

In electric lamps employing tungsten filaments, the phenomenon is usually observed that during the life of the lamp tungsten is deposited on the inside wall of the bulb and gives rise to absorption of light. Consequently, in the manufacture of such lamps, it is customary to incorporate in lamp getter mixtures a substance which, when evaporated from the tungsten filament and deposited on the inside wall of the bulb, has the effect of reducing this light absorption.

It is well known that calcium fluoride may be used in this manner as an anti-blackening agent, but unfortunately its effectiveness varies considerably with the mineral source from which it is derived. Many samples of calcium fluoride from mineral sources have the undesirable effect, when coated onto and volatilised from a tungsten filament, of seriously weakening the filament itself.

Synthetic calcium fluoride almost invariably exhibits this same fault, although from other considerations, such as freedom from contamination by undesirable materials, the use of this material would be very advantageous.

It is the purpose of the present invention to provide a process whereby synthetic calcium fluoride, or unsatisfactory mineral calcium fluoride, is improved so as to permit its use as an anti-blackening agent.

Calcium fluoride binds a monomolecular layer of water to its surface so strongly that, on heating, the water is not driven off as such, but hydrolyses the salt. The products of this hydrolysis are calcium oxide and hydrogen fluoride. All calcium fluoride which has been exposed to the atmosphere has such an adsorbed water layer, and when used in lamps the hydrogen fluoride set free when the salt is volatilised attacks the tungsten filament.

Synthetic calcium fluoride ordinarily suffers from the dual disadvantage that, due to its mode of preparation, it possesses a larger or more active surface which adsorbs more water than does the same weight of mineral calcium fluoride.

According to the present invention, a small quantity, preferably not less than 0.2% of silica or similar refractory oxide such as beryllia, alumina and titania, which is readily attacked by hydrogen fluoride and forms comparatively innocuous compounds which do not corrode the filament, is added to the calcium fluoride. This can conveniently be achieved by milling the calcium fluoride with the finely ground oxide, e. g., quartz or alumina (alundum), and thereafter drying the mixture whereafter it is ready for incorporation in lamp getter mixtures.

Either before or after the addition of the refractory oxide, the calcium fluoride is preferably sintered in order to age and thereby decrease the extent of the surface.

A typical example of the preparation of an anti-blackening agent from synthetic calcium fluoride is as follows:

The synthetic material is sintered at 1100° C. for one hour, is treated with concentrated hydrochloric acid to remove any calcium oxide formed by hydrolysis during the sintering, and is washed with distilled water until free from acid. The sintered material is then milled for 3 days with 2% by weight of finely ground quartz in a steel ball mill. The milled mixture is elutriated with a settling time of 45 minutes. The fines are boiled with concentrated hydrochloric acid to which a small amount of nitric acid has been added to remove iron. The suspension is then filtered and washed with distilled water until free from acid. The calcium fluoride-quartz mixture thus obtained is dried at about 120° C., any aggregates are broken up and the mixture passed through a 240 mesh sieve. The mixture thus obtained is found to contain about 3% by weight of mechanically admixed silica, due to preferential retention of silica during elutriation. This mixture is incorporated in the lampgetter mixture in the usual way.

If the calcium fluoride is not the synthetic material but the mineral material, it may be utilised without preliminary purification and without sintering, provided that the mineral is not less than 98% pure. The milling and further treatment are then as set out above for the synthetic material.

We claim:

1. In the manufacture of electric filament lamps, and for use as an anti-blackening agent to be incorporated in the lampgetter a mixture of calcium fluoride to which has been added a small quantity of refractory oxide which is readily attacked by hydrogen fluoride and forms innocuous compounds which do not corrode the filament.

2. In the manufacture of electric filament lamps, and for use as an anti-blackening agent, a mixture of calcium fluoride containing not less than 0.2% and preferably about 3% by weight of mechanically admixed silica.

3. In the manufacture of electric filament lamps, and for use as an anti-blackening agent, a mixture in accordance with claim 1 of synthetic calcium fluoride which has been sintered and milled with a small quantity not less than 0.2% by weight of quartz.

4. A getter addition for use in electric filament lamps, comprising calcium fluoride reduced to comminuted form and mixed with a refractory oxide that reacts with the fluoride to form a compound that is harmless to the filament.

5. The method of making a getter addition which comprises sintering calcium fluoride at about 1100 deg. centigrade, washing to remove any calcium oxide if formed, then milling with finely ground quartz, washing and then drying.

6. A getter addition formed by the method of claim 5.

7. The method of making a getter addition, which comprises sintering a mass of calcium fluoride, treating it with concentrated hydrochloric acid to remove any calcium oxide formed by the sintering action and washing to remove the acid, milling the sintered material with 2% by weight of finely ground quartz, boiling with acid to remove impurities added during the milling operation, filtering and washing the residue to remove the acids, and drying and breaking up the final mixture to about 240 mesh fineness.

8. A getter addition for use as an anti-blackening agent in incandescent filament lamps, comprising a comminuted mixture of calcium fluoride and a small quantity of refractory oxide which combines with hydrogen fluoride to form compounds that will not corrode the filament.

9. In the manufacture of electric filament lamps, and for use as an anti-blackening agent, a mixture of calcium fluoride containing a small quantity not less than 0.2% by weight of alumina.

10. In the manufacture of electric filament lamps, and for use as an anti-blackening agent, a mixture of calcium fluoride containing a small quantity not less than 0.2% by weight of beryllia.

SIDNEY LAUNCELOT MARTIN.
CHRISTOPHER FREDERIC
PETER BEVINGTON.

REFERENCES CITED

The following references are of record in the file of this patent:

UNITED STATES PATENTS

| Number | Name | Date |
| --- | --- | --- |
| 1,622,826 | Gustin | Mar. 29, 1927 |
| 1,468,084 | Salz | Sept. 18, 1923 |
| 1,099,721 | Von Pirani | June 9, 1914 |